US008161183B2

(12) United States Patent
Boehme et al.

(10) Patent No.: US 8,161,183 B2
(45) Date of Patent: Apr. 17, 2012

(54) DISTRIBUTING INFORMATION IN A MARKUP LANGUAGE WITHIN A COMPUTER SYSTEM

(75) Inventors: Thomas Friedhelm Boehme, Leinfelden-Echterdingen (DE); Klaus Rindtorff, Weil im Schoenbuch (DE); Thomas Schaeck, Achern (DE); Roland Weber, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 2754 days.

(21) Appl. No.: 10/024,118

(22) Filed: Dec. 19, 2001

(65) Prior Publication Data
US 2002/0116511 A1 Aug. 22, 2002

(30) Foreign Application Priority Data
Dec. 23, 2000 (DE) .................................. 00128496

(51) Int. Cl.
*G06F 13/00* (2006.01)
(52) U.S. Cl. ..................... 709/236; 709/232; 709/217
(58) Field of Classification Search .................. 709/238, 709/236, 232, 217–219, 203
See application file for complete search history.

(56) References Cited

U.S. PATENT DOCUMENTS

| 6,327,628 B1 * | 12/2001 | Anuff et al. ............ 719/311 |
| 6,389,496 B1 * | 5/2002 | Matsuda ............... 710/316 |
| 6,401,125 B1 * | 6/2002 | Makarios et al. ......... 709/229 |
| 6,438,575 B1 * | 8/2002 | Khan et al. ............ 709/200 |
| 6,460,038 B1 * | 10/2002 | Khan et al. ............ 707/10 |
| 6,498,795 B1 * | 12/2002 | Zhang et al. ........... 370/400 |
| 6,516,311 B1 * | 2/2003 | Yacoby et al. .......... 707/3 |
| 6,516,349 B1 * | 2/2003 | Lieberman ............. 709/225 |
| 6,668,353 B1 | 12/2003 | Jurkovic |
| 6,670,968 B1 * | 12/2003 | Schilit et al. .......... 715/760 |
| 6,687,350 B1 | 2/2004 | Landry |
| 6,701,522 B1 * | 3/2004 | Rubin et al. ........... 717/178 |
| 6,721,716 B1 * | 4/2004 | Gross ................. 705/40 |
| 6,735,586 B2 * | 5/2004 | Timmons .............. 707/3 |
| 6,735,624 B1 * | 5/2004 | Rubin et al. ........... 709/219 |
| 6,754,833 B1 * | 6/2004 | Black et al. ........... 713/201 |
| 6,826,693 B1 | 11/2004 | Yoshida |
| 6,996,800 B2 * | 2/2006 | Lucassen et al. ........ 717/106 |
| 7,043,231 B2 * | 5/2006 | Bhatia et al. .......... 370/356 |
| 7,043,450 B2 * | 5/2006 | Velez et al. ........... 705/37 |

(Continued)

FOREIGN PATENT DOCUMENTS
JP 8069440 3/1996
(Continued)

OTHER PUBLICATIONS

O'Leary "Portal Wars" Online, Wilton, vol. 23, Issue 1, p. 77-79, Jan./Feb. 1999.*

(Continued)

*Primary Examiner* — Kenneth R Coulter
(74) *Attorney, Agent, or Firm* — William Stock; Anne Vachon Dougherty

(57) ABSTRACT

Computer-based methods and systems are described wherein at least one content provider, a portal and a user are coupled to a communications network or content delivery network. The content provider provides means for generating information in a markup language and for sending the information to a portal. The portal comprises means for combining information received from one or more content providers and for sending the combined information to the user.

14 Claims, 1 Drawing Sheet

U.S. PATENT DOCUMENTS

| | | | |
|---|---|---|---|
| 7,072,932 B1 * | 7/2006 | Stahl | 709/203 |
| 7,089,295 B2 * | 8/2006 | Christfort et al. | 709/219 |
| 7,089,560 B1 * | 8/2006 | Uhler et al. | 719/311 |
| 7,111,078 B2 * | 9/2006 | Keorkunian et al. | 709/246 |
| 7,120,700 B2 * | 10/2006 | Macleod Beck et al. | 709/242 |
| 2002/0018078 A1 * | 2/2002 | Khan et al. | 345/762 |
| 2002/0087690 A1 * | 7/2002 | Hepper et al. | 709/225 |

FOREIGN PATENT DOCUMENTS

| | | |
|---|---|---|
| JP | 2000-122871 | 4/2000 |
| JP | 2000-347968 | 12/2000 |
| WO | WO 00/75812 A1 * | 12/2000 |
| WO | WO 0075812 A | 12/2000 |

OTHER PUBLICATIONS

"Netscape Delivers New Custom Portal Service" Information Today, vol. 16, No. 2, Feb. 1999.*

Spring, "Portals Get Really Personal" PC World, Apr. 2, 2000.*

Moskowitz "Pare Your Web to OnePage.com" PC World, May 23, 2000.*

Broida "Portals of Call" Home Office Computing, Boulder: vol. 16, Issue 12, p. 46, Dec. 1998.*

Gardner "Oracle works to make building e-commerce portals easier" InfoWorld Electric, Sep. 22, 1999.*

Biggs "Review: Oracle alleviates Web content jam" Enterprise Computing, vol. 21, Issue 15, Apr. 12, 1999.*

Dumbill, Edd, "XML at Jetspeed," XML.com Copyright © 1998-2003 O'Reilly & Associates, Inc. http://www.xml.com/lpt/a/2000/05/15/jetspeed/index.

Dumbill, E., "XML at Jetspeed", XML.COM, May 15, 2000, pp. 1-5.

Spitzer, T., "Vertical horizon. Surveying the landscape of online industry", Web Techniques, Feb. 2000, vol. 5, No. 2, Miller Freeman, USA.

Van Halteran, A., et al, "Value added Web: integrating WWW with a TINA service management platform", TINA, Apr. 12, 1999, pp. 14-23, Piscataway, N.J., USA.

* cited by examiner

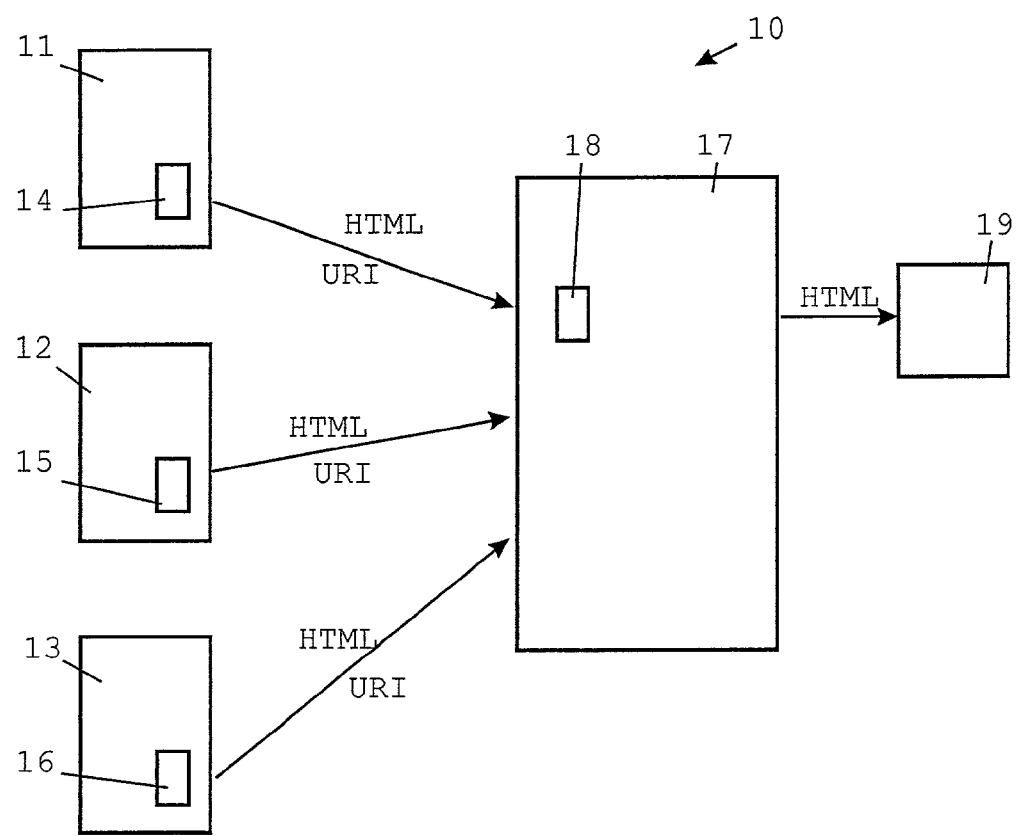

DISTRIBUTING INFORMATION IN A MARKUP LANGUAGE WITHIN A COMPUTER SYSTEM

BACKGROUND OF THE INVENTION

1. Technical Field

The invention relates to methods and systems for providing information in a content delivery system and, more specifically, to methods of providing information from a content provider through a portal to a user.

2. Description of Related Art

In known computer systems, the user may reside on a computer with a known browser and may be connected to the Internet. If the user requires information, it is possible to access a portal via the Internet and to request the desired information from the portal.

In known systems, the portal replicates all information which may be requested by users from the content providers and stores all that information in its own system. This storage tends to use a large amount of memory space within the portal. Once a content provider's information is stored at the portal, however, the content provider no longer has control of the provided information, because, for example, the portal may forward the information to another portal without the permission of the content provider.

If a user requests some information, the portal may combine sources of information from its stored content before sending the combined information to the requester.

When a portal replicates information from various content providers, the information is stored in the specific format of the information within the portal. This has the consequence that the portal needs to provide a content-specific application (also known as portlet) which is able to convert the required information from the specific format of the content provider into a format such as the Hypertext Markup Language (HTML), which may be displayed by the browser of the user. The conversion of the requested information leads to another effort which has to be carried out by the portal. Furthermore, this task is quite cumbersome, because the portal needs to be familiar with all formats of the information provided by the different content providers.

To solve this problem, content providers often create portlets and offer them to portals. However, this leads to the fact that the portal takes over software from the content providers which may include undesirable logic or data such as viruses or the like.

Another disadvantage of known systems is the fact that a portal typically has to pay fees in advance to content providers for the information they provide. If, then, the information is not requested by the portal's users, the portal does not recoup the fees it has paid because it receives little or no compensation from its users.

Therefore, a need exists for a method of operating a computer system that is capable of converting content in a desired format without using excessive memory space. A need also exists for systems and methods that provide content in a desired format while overcoming the drawbacks described above with respect to known methods and systems.

SUMMARY OF THE INVENTION

The present invention provides methods and systems for providing information in a communication network or content delivery network wherein nodes coupled to the network are represented by at least one content provider, a portal and users. According to the invention, a portal is capable of providing information to users in the common format of a markup language, rather than in the specific format of a content provider. The portal does not require computer programs which, in known systems, are necessary to convert the information from the specific format of the content provider into a common format. Instead, a computer-based method may be used by the one or more content providers to generate the information in a markup language before sending it to the portal. The computer-based method used by the content provider is referred to herein as a specific portlet. The portal uses a computer-based method which is able to combine the information received from the content providers in the markup language. This computer-based method is referred to herein as a generic portlet which is associated with the portal.

In one aspect of the invention, a computer-based method of providing information between a plurality of nodes is coupled to a communication network. The method comprises the steps of:

receiving, at a portal node, information from at least one content provider node, wherein the information has been generated in a markup language at the at least one content provider node;

combining, at the portal node, the received information; and sending, from the portal node, the combined information to a user node.

In a second aspect of the invention, the computer-based method comprises the steps of: generating, within at least one content provider node, information in a markup language; and sending, from the at least one content provider node, the generated information to a portal node for combining and sending the information to a user node.

The invention may be embodied in the form of a computer program product for use in a content delivery network comprising a plurality of nodes, the product comprising a machine readable medium containing one or more programs which when executed implement the method steps described herein.

Objects, features and advantages of the invention will become apparent from the following detailed description of illustrative embodiments thereof, which is to be read in connection with the accompanying drawing.

BRIEF DESCRIPTION OF THE DRAWING

FIG. 1 is a block diagram illustrating an information delivery system according to an embodiment of the present invention and an overall environment in which such system may operate.

DETAILED DESCRIPTION OF THE PREFERRED EMBODIMENT

The description which follows differentiates between the location where content or information is stored and the location where the information is combined. As used in this specification and the appended claims, the term "portlet," which refers to a content-specific application that runs on a portal in known systems, is described as either a specific portlet or a generic portlet. The specific portlet is associated with the content provider and is provided for generating the required information in a markup language. The generic portlet is associated with the portal and is provided for combining the information in said markup language.

According to the present invention, information is sent from a content provider to a portal not in the specific format of the content provider, but in the common format of a markup language. This is accomplished by introducing a specific portlet within the content provider. The specific portlet generates information in a markup language out of the specific format of the content provider.

As a result, the portal does not require computer programs which, in known systems, are necessary to convert the information from the specific format of the content provider into a common format. Instead, the portal uses a computer-based method which is able to combine the information received from the content providers in the markup language. This computer-based method is the generic portlet within the portal.

According to a preferred embodiment of the invention, it is not necessary to replicate all information from the content providers to the portal. Thus, the portal is not required to use up extra memory space for such information. Instead, if a user requests information from the portal, the portal may forward the request to the relevant content provider(s). The content provider may then return the requested information to the portal in the markup language. The portal may combine information as needed and send the combined information back to the user.

If a portal does not need to replicate all information from its content providers, the portal may not need to pay any fees for this information in advance of any requests from users. If a user requests information from the portal which will cause the portal to be charged with a fee by a content provider, the portal may first ask the user for confirmation and then send the requested information after having received the confirmation from the user.

This aspect of the invention allows for a payment system which is based on the requested information, and in which the portal is involved as a forwarding institution between the user and the content provider, but not as an institution which is paying fees in advance.

In another aspect of the invention, when a content provider changes its information or adds new information, it may do so independently of a portal's operations. That is, the portal does not have to replicate or store the information, because these changes and additions are associated with the content provider. The content provider also has more control over the information it provides, because the information does not have to be stored with the portal.

FIG. 1 is an illustration of a computing environment 10 and a number of content providers 11, 12, 13. Content providers 11, 12, 13 provide any kind of information, such as news, weather, stock quotes and so on. Content providers 11, 12, 13 are located on server computers within computing environment 10.

Any of the content providers 11, 12, 13 comprises at least one specific portlet 14, 15, 16 which comprises software running on the respective server computer of the content provider 11, 12, 13. The specific portlets 14, 15, 16 are able to generate the information which is present within the content provider 11, 12, 13 in a markup language, such as, for example, Hypertext Markup Language (HTML). The generated HTML-markup may be a fragment, i.e. the generated fragment may not actually contain any HTML-tag but may be limited to less. Alternatively, the generated HTML-markup may be a well-defined HTML-document. The generated HTML-markup of the information, i.e. the fragments or the documents, may then be sent from the content providers 11, 12, 13 to a portal 17.

Portal 17 collects the information received from the content providers 11, 12, 13. The portal 17 is located on a server computer (not shown) within computing environment 10. The portal 17 comprises at least one so-called generic portlet 18 which comprises software running on the server computer of the portal 17. In particular, the generic portlet 18 is able to combine the fragments and documents of information sent by the several content providers 11, 12, 13 into complete information.

The combined and complete information may then be sent from the portal 17 to at least one user 19. Typically, the user 19 requests the information from the portal 17. The user 19 preferably comprises a client computer with browser software.

In running conditions, the portal 17 identifies all available content providers 11, 12, 13 and establishes a corresponding list. This list may then be offered to all users 19 and/or information requests or only to some of them.

If a user requests information, the request may be sent from the user 19 to the portal 17. For that purpose, the browser of the user's client computer 19 is used. The information request may therefore be sent as HTML-markup from the user 19 to the portal 17.

The portal 17 may connect to one or more of the content providers 11, 12, 13 synchronously or asynchronously and collect the information requested by the user 19. During this connection, additional data may be exchanged between the portal 17 and the content providers 11, 12, 13. Such data may, for example, relate to the name and/or address of the user 19, the type of browser which is used by the user 19, and the like.

The information requested from the content providers 11, 12, 13 may be generated within the content providers 11, 12, 13. For that purpose, specific portlets 14, 15, 16 within the content providers 11, 12, 13 generate the relevant part of the requested information or the entire requested information as a fragment or a document in HTML-markup. By way of example, specific portlet 16 of content provider 13 may generate a document of stock quotes or at least a fragment of some stock quotes in HTML-markup.

It is important to notice that the generated fragment in HTML-markup may not be generated as a valid or well-formed HTML-document. In particular, the fragment may not contain any HTML-tags but rather may limit itself to any other HTML-markup. It is emphasized that the fragment may also be generated in any other kind of markup language, for example the Wireless Markup Language (WML) or the like.

Specific portlets 14, 15, 16 within content providers 11, 12, 13 are adapted to the respective information of the content provider 11, 12, 13 and in particular to the format of that information. Therefore, the specific portlets 14, 15, 16 within the different content providers 11, 12, 13 may be different. That is the reason they are called specific portlets. As a consequence, specific portlets 14, 15, 16 may be established and updated by the content providers 11, 12, 13 themselves with the advantage that the entities, e.g., the content providers 11, 12, 13, that provide the information may also provide the corresponding specific portlets 14, 15, 16 for generating the fragments of information in markup, such as, for example, HTML-markup.

The fragments of, for example, HTML-markup may be sent from any of content providers 11, 12, 13 to portal 17. Portal 17 collects the received information and combines it into the requested information. For that purpose, generic portlet 18 may be used within the portal. Generic portlet 18 is able to interpret fragments in a given markup such as HTML-markup and combine them into complete information. As all fragments are received as a particular markup, such as HTML-markup, this portlet 18 is called generic.

The combined and completed information may be sent from the portal 17 back to the user 19. The information may be sent again in markup such as HTML-markup. The information received by the user 19 may then be displayed on the computer system to the user with the help of the browser 19.

The content format between the content providers 11, 12, 13, the portal 17 and the user 19 may be but does not need to be based on HTML-markup. Those of ordinary skill in the art will appreciate that the references to HTML-markup herein are merely for illustrative purposes, and that other markup languages may be used to generate fragments or documents of information for the purposes of the present invention. However, due to the use of HTML-markup on the Internet, this format is advantageous.

If the described computing environment 10 is realized on the Internet, then Uniform Resource Identifiers (URIs) instead of fragments or documents of HTML-markup may be sent from the content providers 11, 12, 13 to the portal 17. According to this embodiment of the invention, portal 17 may combine the URIs in substantially the same way as the fragments and documents of HTML-markup. The portal 17 may then send the combined and completed information as, for example, HTML-markup to the user 19.

If portal 17 provides data concerning, e.g., the type of the browser of the user 19 to the content providers 11, 12, 13, then it is possible that only those content providers 11, 12, 13 that are able to send their fragments or documents of information in a format which is compatible with the browser of the user 19 may participate in the provision of information to this user 19. A content provider 11, 12, 13 which is not compatible with a particular browser may thereby be excluded.

If the information to be provided from any of content providers 11, 12 or 13 to portal 17 is associated with a fee, the respective content provider 11, 12 or 13 may first send a charge request to the portal 17 instead of the requested information. If the fee to be charged is confirmed, the requested information may be sent in a second step.

A fee may be positive if, e.g., the content provider 11, 12 or 13 wants to include advertisements in the information to be provided. In this case, the content provider 11, 12 or 13 may be expected to pay a fee to the portal 17 instead of the other way around. For a faster provision of information, the content providers 11, 12, 13 may assume, for example, that the portal 17 agrees to receive advertisements together with the requested information. In this case, the fee to be paid by a content provider 11, 12 or 13 may be credited automatically to the portal 17.

The fee may be negative if, e.g., the content provider 11, 12 or 13 charges the information to be provided with the fee. In this case, the portal 17 may ask the user 19 whether the user 19 accepts this fee. The fee to be paid may be displayed to the user 19. Then, the portal 17 may forward the acceptance or rejection of the fee to the respective content provider 11, 12 or 13 depending on the response of the user 19. For fast provision of information, content providers 11, 12 or 13 may assume that the user 19 will accept the fee so that the requested information may be sent without any confirmation by the user 19.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-based method of providing information between a plurality of nodes coupled to a communication network wherein the plurality of nodes comprises more than one content provider nodes, at least one user node, and a portal node between said content providers and said at least one user node, the method comprising the steps of:
   receiving, at a portal node, user-requested content information from more than one content provider nodes, wherein the user-requested content information has been generated in a markup language using multiple different portlets comprising a specific portlet at each of the more than one content provider nodes;
   combining, at the portal node, the received user-requested content information using a generic portlet to produce combined user-requested content information; and
   sending, from the portal node, the combined user-requested content information to a user node.

2. The method of claim 1, wherein the content information comprises fragments of information generated in the markup language at the more than one content provider nodes, and wherein the combining step comprises combining the fragments of information into the combined user-requested content information.

3. The method of claim 1, wherein the combined user-requested content information is configured for displaying on a browser at the user node.

4. The method of claim 1, wherein the markup language is the Hypertext Markup Language (HTML).

5. The method of claim 1, wherein the user-requested content information received from the at least one of the more than one content provider nodes is associated with a fee.

6. The method of claim 5, further comprising the step of accepting a fee before the receiving step.

7. A computer-based method of providing information between a plurality of nodes coupled to a communication network wherein the plurality of nodes comprises more than one content provider nodes at least one user node, and a portal node between the content provider nodes and the user nodes, the method comprising the steps of:
   generating, within at least one content provider node, user-requested content information in a markup language using a specific portlet;
   sending, from the at least one content provider node, the generated user-requested content information to a portal node for combining with information in the markup language received from other content provider nodes using different specific portlets to produce combined user-requested content information and sending the combined user-requested content information to a user node using a generic portlet.

8. The method of claim 7, wherein the generating step comprises generating fragments of information in the markup language, and wherein the sending step comprises sending the fragments of information to a portal node for combining and sending to a user node.

9. The method of claim 7, wherein the user-requested content information sent to the user node is configured for displaying on a browser at the user node.

10. The method of claim 7, wherein the markup language is the Hypertext Markup Language (HTML).

11. The method of claim 7, further comprising the step of associating the generated user-requested content information with a fee.

12. The method of claim 11, further comprising the step of charging a fee before the sending step.

13. A computer program product for use in a content delivery network comprising a plurality of nodes, the product comprising a machine readable medium containing one or more programs which when executed implement the steps of:

receiving, at a portal node, user-requested content information from more than one content provider nodes comprising multiple different portlets, each content provider node having a specific portlet, wherein the user-requested content information has been generated in a markup language using a specific portlet at each of the more than one content provider nodes;

combining, at the portal node, the received user-requested content information using a generic portlet to produce combined user-requested content information; and sending, from the portal node, the combined user-requested content information to a user node.

14. A computer program product for use in a content delivery network comprising a plurality of nodes, the product comprising a machine readable medium containing one or more programs which when executed implement the steps of:

generating, within at least one content provider node, user-requested content information in a markup language using a specific portlet;

sending, from the at least one content provider node, the generated information to a portal node for combining with information in the markup language received from other content provider nodes to produce combined user-requested content information and sending the combined user-requested content information to a user node using a generic portlet.

* * * * *